US007167349B2

(12) United States Patent
Asano et al.

(10) Patent No.: US 7,167,349 B2
(45) Date of Patent: Jan. 23, 2007

(54) EARTH LEAKAGE BREAKER

(75) Inventors: Hisanobu Asano, Saitama (JP); Koji Asakawa, Saitama (JP); Yasuhiro Takahashi, Saitama (JP)

(73) Assignee: Fuji Electric FA Components & Systems Co., Ltd., Tokyo (JP)

( * ) Notice: Subject to any disclaimer, the term of this patent is extended or adjusted under 35 U.S.C. 154(b) by 192 days.

(21) Appl. No.: 10/790,197

(22) Filed: Mar. 2, 2004

(65) Prior Publication Data

US 2004/0233594 A1 Nov. 25, 2004

(30) Foreign Application Priority Data

May 21, 2003 (JP) ............................ 2003-143432

(51) Int. Cl.

*H02H 3/00* (2006.01)
*H02H 9/08* (2006.01)
*H02H 3/16* (2006.01)
*H02H 3/26* (2006.01)
*H02H 3/32* (2006.01)

(52) U.S. Cl. .......................................... 361/42; 361/44

(58) Field of Classification Search .................. 335/18, 335/202; 361/42, 45–46, 44; 340/635, 638, 340/653

See application file for complete search history.

(56) References Cited

U.S. PATENT DOCUMENTS 6,784,770 B1 * 8/2004 Gimenez et al. .............. 335/18
2001/0022713 A1 9/2001 Gimenez et al.

FOREIGN PATENT DOCUMENTS

EP 0 611 224 8/1984
EP 0320409 6/1989

* cited by examiner

*Primary Examiner*—Brian Sircus
*Assistant Examiner*—Dharti H. Patel
(74) *Attorney, Agent, or Firm*—Manabu Kanesaka

(57) ABSTRACT

An earth leakage breaker includes a main contact, a switch mechanism, an operating handle, a leakage tripping device and an over-current tripping device having an earth-leakage-detection circuit disposed in a main-body case. A power-supply line connects the earth-leakage-detection circuit to the main circuit for supplying voltage between phases of the main circuit as a power source of the earth-leakage-detection circuit. Further, a test switch is provided for turning on and off a power-supply circuit of the power-supply line connected to the earth-leakage-detection circuit, and an operation of the test switch is linked to an ON/OFF operation of the switch mechanism.

16 Claims, 14 Drawing Sheets

EARTH LEAKAGE BREAKER

BACKGROUND OF THE INVENTION AND RELATED ART STATEMENT

The present invention relates to an earth leakage breaker having a function of protecting a circuit of a low-voltage power distribution system against over-current and ground failure. More particularly, the present invention relates to an earth leakage breaker having protective means for disconnecting an earth-leakage-detection circuit from a main power distribution circuit when a dielectric-strength test is conducted.

As a conventional device for protecting a low-voltage power distribution system, a circuit breaker and an earth leakage breaker have been well known. An earth leakage breaker currently available has a function of protecting against over-current and ground failure. A conventional earth leakage breaker, for example, as disclosed in Japanese Patent No. 3246562, has a configuration in which a circuit breaker or an earth leakage breaker on an identical frame is retained in a main-body case with an identical size and common main components are used, so that it is convenient to use.

Further, as disclosed in Japanese Patent No. 3097368, a circuit breaker or an earth leakage breaker is provided with various attachments such as an auxiliary switch, an alarm switch, a voltage tripping coil, a short-voltage tripping coil, and the like, so that the circuit breaker or the earth leakage breaker can be applicable to a wide variety of protecting systems for a power distribution system.

A circuit diagram of a conventional earth leakage breaker (for a 3-phase circuit) is shown in FIG. 12, and a structure thereof is shown in FIG. 13. In FIG. 12, the reference numeral 1 designates a main circuit comprising phases R, S, and T. The reference numeral 2 designates main contacts. The reference numeral 3 designates a switch mechanism of the main contact 2. The reference numeral 4 designates an operating handle. The reference numeral 5 designates a thermal or electro-magnetic over-current tripping device for detecting an over-current or short-circuit current so that the switch mechanism performs a tripping operation.

A leakage tripping device detects ground failure in a power distribution system, so that the switch mechanism performs a tripping operation. The leakage tripping device comprises a zero-phase current transformer 6 for detecting an unbalanced current in the main circuit 1 with the main circuit 1 of the R-S-T-phase as a primary conductor; an earth-leakage-detection circuit 7 (electronic circuit including an IC) for detecting the ground failure according to a secondary output level of the zero-phase current transformer 6; and a tripping-coil unit 8 for causing the switch mechanism to perform the tripping operation upon reception of an output signal from the earth-leakage-detection circuit 7.

Inter-phase voltage of the main circuit 1 is supplied to the earth-leakage-detection circuit 7 as a power source thereof via a power-supply line 9 and a rectifying circuit 10 disposed between the main circuit 1 and the earth-leakage-detection circuit 7. In FIG. 12, inter-phase voltage between the R-T phases of the main circuit 1 is supplied to the earth-leakage-detection circuit 7. Voltage at the R-T-S phases may be converted to DC voltage, and the DC voltage is supplied to the earth-leakage-detection circuit 7.

As shown in FIG. 13, the reference numeral 11 designates a main-body case partitioned into two parts, i.e. a lower case portion 11*a* and an upper cover portion 11*b*. The reference numerals 12 and 13 designate main-circuit terminals (screw terminals) at a side of a power source and a side of a load, respectively. The reference numeral 14 designates a stationary contact connected to the main-circuit terminal 12. The reference numeral 15 designates a movable contact. The reference numeral 16 designates a rotary contact holder for supporting the movable contact 15. The reference numeral 17 designates an arc extinction unit.

The switch mechanism 3 comprises an assembly of a toggle-link mechanism comprising a toggle link 3*a* interconnecting the contact holder 16 and the operating handle 4 and an opening/closing spring 3*b* ; and a latching mechanism comprising a latch unit 18, a latch receiver 19, and a tripping cross bar 20. The tripping cross bar 20 faces the over-current tripping device 5 and an operating end portion of the tripping-coil unit 8 (shown in FIG. 12). The latching mechanism shown in FIG. 13 is an example, and there are other latching mechanism structures.

As shown in FIG. 14, the main-body case 11 is provided with partitions 11*c* for dividing components of each of the phases mounted in the main-body case 11. The leakage detecting circuit 7 is mounted on a print board 7*a*, and installed inside the main-body case 11 (space between the zero-phase current transformer 6 and a side wall of the main-body case 11). The power supply line 9 (refer to FIG. 12) is connected between the leakage detecting circuits 7 and conductors of the main circuit 1. In the main-body case 11, there are disposed a lead wire corresponding to the over-current tripping device 5 disposed in series to each phase of the main circuit 1, lead wires connecting a secondary output side of the zero-phase current transformer 6 and the earth-leakage-detection circuit 7, and lead wires connecting the earth-leakage-detection circuit 7 and the tripping-coil unit 8.

In the above constitution, when the operating handle 4 is moved between ON/OFF positions, the toggle-link mechanism of the switch mechanism 3 is operated along with the operating handle 4, thereby opening and closing the movable contact 15. In a state that the main contacts are closed (ON) as shown FIG. 13, the latch unit 18 engages the latch receiver 19, and the tripping cross bar 20 supports the latch receiver 19 at this position. When an over-current or short-circuit current flows in the main circuit 1 under the above condition, the over-current tripping device 5 is activated, so that the tripping cross bar 20 rotates counterclockwise to release the latch receiver 19 from the latch unit 18. Accordingly, the switch mechanism 3 performs a tripping operation to separate the movable contact 15 from the stationary contact 14, thereby shutting off the current flowing through the main circuit 1.

When the ground-failure current flows through the main circuit 1, the tripping-coil unit 8 of the leakage tripping device is activated, so that the tripping cross bar 20 moves to a release position. Accordingly, the switch mechanism 3 performs the tripping operation to open the movable contact 15, thereby shutting off the current flowing through the main circuit 1. After the tripping operation, the operating handle 4 is returned to RESET position from the tripping position (slightly beyond OFF position) to reset the latching mechanism, and the operating handle 4 is moved from the OFF position to the ON position to close the movable contact 15, so that the breaker is activated again.

For the safety reason, the earth leakage breakers need to meet dielectric strength requirements according to the industry standard. Accordingly, an individual product is subject to a test to confirm that the product meets the requirements. According to a test method specified by the industry standard, specific voltage is applied between the phases of the main-circuit terminals. The specific voltage depends on a rated voltage of the earth leakage breaker, for example, a test voltage of 2,500 V is applied to an earth leakage breaker with the rated voltage of 300 V to 600 V.

In Japan, it is customary that a manufacturer conducts the dielectric-strength test before shipment of the product. In this case, if high voltage is applied between the phases while the earth-leakage-detection circuit (IC) is connected to the main circuit in the assembled state of the earth leakage breaker, the high voltage damages the earth-leakage-detection circuit. For this reason, the dielectric-strength test is conducted after the power lines of the earth-leakage-detection circuit are disconnected.

On the other hand, unlike the practice in Japan, in Europe and the U.S., a circuit breaker is provided with an earth-leakage-detection unit (unit of a zero-phase current transformer and an earth-leakage-detection circuit) as a separated unit. Accordingly, a service person conducts the dielectric-strength test in a state that the earth-leakage-detection unit is attached to the circuit breaker. In order to conduct the dielectric-strength test, U.S. patent publication No. 2001/0022713A1 has disclosed an earth-leakage-detection unit provided with a push-button-type switch for the dielectric-strength test. When the dielectric-strength test is conducted, the switch is operated to disconnect the earth-leakage-detection circuit from the main circuit. After the test, the switch is operated to connect the earth-leakage-detection circuit to the main circuit, thereby restoring a normal use condition.

The conventional earth leakage breakers have the following disadvantages with respect to the dielectric-strength test. As shown in FIG. 13, the earth leakage breaker is assembled in the main-body case in which the leakage tripping device including the components of the circuit breaker and the earth-leakage-detection circuit is installed. Accordingly, when the dielectric-strength test is conducted, it is necessary to remove an external cover of the main-body case, and disconnect the earth-leakage-detection circuit from the main circuit by removing soldered portions or screwed portions of the power-supply lines between the earth-leakage-detection circuit and the main circuit, thereby requiring a large amount of work.

In the earth-leakage-detection device disclosed in U.S. Patent Publication No. 2001/0022713A1, it is arranged such that when the switch provided in the earth-leakage-detection unit is turned OFF to conduct the dielectric-strength test, the earth-leakage-detection circuit is disconnected from the main circuit and the circuit breaker performs the tripping operation to open the main contact. Accordingly, it is possible to safely conduct the dielectric-strength test by disconnecting the earth-leakage-detection circuit from the main circuit.

However, the operation of the switch is not linked to the opening/closing operation of the circuit breaker, and the switch can be operated independently to restore the ON state. Therefore, after the dielectric-strength test, even when the switch is not returned to the ON status, it is possible to manually operate a handle provided in the circuit breaker to turn on the main contacts. Accordingly, an operator may forget to return the switch to the ON status after the dielectric-strength test, and the operator manually operates the handle provided in the circuit breaker to turn on the main contacts, so that the circuit breaker returns to an operable status. In this case, the earth-leakage-detection circuit remains disconnected from the main circuit. As a result, when the ground failure occurs in the circuit breaker in the operable state, the protective function against the leakage does not work.

Further, the earth leakage breaker has an outer dimension same as that of the circuit breaker. As shown in FIG. 14, the components for over-current protection and leakage protection are arranged inside the main-body case with no space, and there is no sufficient room for disposing an additional switch for the test. Therefore, in order to provide a space for the switch for the test in the main-body case, it is necessary to change a design of the components and a layout thereof. It takes a large amount of cost and time to change the common components in the circuit breaker and the earth leakage breaker, and the layout thereof.

In view of the problems described above, the present invention has been made, and an object of the present invention is to provide an earth leakage breaker comprising components of a circuit breaker, an earth-leakage-detection circuit, and an over-current tripping device assembled in a single body case as shown in FIG. 13. In the earth leakage breaker, it is possible to disconnect the earth-leakage-detection circuit from the main circuit via a simple operation, so that the dielectric-strength test is safely conducted after shipment of a product.

Another object of the present invention is to provide an earth leakage breaker in which a test switch is added in a space of a main-body case without significantly changing components and a layout of the earth leakage breaker, so that the dielectric-strength test is safely conducted after shipment of a product.

Further object and advantages of the invention will be apparent from the following description of the invention.

SUMMARY OF THE INVENTION

To achieve the objects described above, according to a first aspect of the present invention, an earth leakage breaker has a function of protecting against over-current and ground failure. The earth leakage breaker comprises a main contact, a switch mechanism, an operating handle, a leakage tripping device and an over-current tripping device having an earth-leakage-detection circuit and is disposed in a main-body case. A power source of the earth-leakage-detection circuit is supplied through the power-supply line connected to the main circuit.

A test switch is provided for turning on and off a power-supply circuit of the power-supply line, and an operation of the test switch is linked to an ON/OFF operation of the main contact. The test switch may be an auxiliary switch attached to the earth leakage breaker.

In the first aspect of the present invention, when the operating handle is operated to open the main contact for a dielectric-strength test, the test switch automatically turns OFF to disconnect the power-supply circuit of the power-supply line between the main circuit and the earth-leakage-detection circuit. Accordingly, before the dielectric-strength test, it is not necessary to remove an external cover of the earth leakage breaker and soldered portions of a wiring of the earth-leakage-detection circuit, so that the dielectric-strength test is safely conducted after shutting off the voltage between the phases of the main circuit supplied to the earth-leakage-detection circuit. After the dielectric-strength test, when the operating handle is operated to close the main contact, the test switch simultaneously returns to an ON state, so that the power-supply circuit of the earth-leakage-detection circuit returns to an electrically conductive state.

In the first aspect of the present invention, the test switch may be the auxiliary switch, i.e. an attachment of the earth leakage breaker. In this case, the auxiliary switch is connected to the power-supply line between the main circuit and the earth-leakage-detection circuit. Accordingly, it is possible to modify the earth leakage breaker for the dielectric-strength test without making any substantial change in the earth leakage breaker. The auxiliary switch has an original function of retrieving an electric signal indicating an actual status of the main contact of the earth leakage breaker.

The earth leakage breaker further includes a switch for testing dielectric strength which disconnects the power source line, and the switch for testing dielectric strength is constituted of a manually operable switch for testing dielectric strength which is connected to the respective lines or the respective lines excluding one line of the power source lines, and collectively turns the power source lines ON and OFF. The earth leakage breaker further includes a manually operable switch for testing dielectric strength which turns a power supply circuit of the power source line ON and OFF, and the switch for testing dielectric strength interrupts the power supply to the main circuit when the switch for testing dielectric strength is held at the OFF position. Further, the earth leakage breaker includes a switch for testing the dielectric-strength which turns ON and OFF the power supply circuit of the power source line, and the switch-gear mechanism is allowed to execute a tripping operation in linkage with a turn-off operation of the dielectric-strength testing switch so as to cause the main contact to open. The test switch may have the following configurations.

The test switch may be provided with an actuator linked to the operation thereof. The actuator is connected to a tripping cross bar of the switch mechanism. When the test switch turns OFF, the tripping cross bar is driven to a latch release position and the switch mechanism performs the tripping operation. At this time, the tripping cross bar is held at the latch release position, so that the main contact does not return to the ON state. When the test switch returns to the ON state, the tripping cross bar is released from the latch release position.

The test switch may be provided with an actuator linked to the operation thereof. The actuator is connected to a tripping cross bar of the switch mechanism. When the test switch turns OFF, the tripping cross bar is driven to a latch release position and the switch mechanism performs the tripping operation. When the operating handle is operated to reset the breaker, the tripping cross bar is driven to a latch-locked position to reset the latching mechanism. At the same time, the test switch returns to the ON state via the tripping cross bar.

The test switch may include a sliding switch or a toggle switch. In this case, the actuator is attached to an operating member connected to an operating knob of the switch, and the actuator is connected to the tripping cross bar.

In the first aspect of the present invention, when the test switch is turned OFF for the dielectric-strength test, the earth-leakage-detection circuit is disconnected from the main circuit. At this time, linked to the operation of the test switch, the switch mechanism performs the tripping operation to open the main contact. Accordingly, the earth leakage breaker is ready for the dielectric-strength test, and the dielectric-strength test is conducted safely in a state that the earth-leakage-detection circuit is disconnected from the main circuit.

When the test switch is in the OFF state, the tripping cross bar is held at the latch release position. Accordingly, even if the operating handle is operated to the ON position to reset the main contact without returning the test switch to the ON state, the latching mechanism is not reset and the main contact is not closed. Therefore, after the dielectric-strength test, if the test switch is not turned on and the earth-leakage-detection circuit is disconnected from the main circuit, the main contact is not closed and the earth leakage does not return to the operable condition.

Further, when the operating handle is operated to reset the breaker, the tripping cross bar returns to reset the latching mechanism, and the test switch returns to the ON state via the tripping cross bar connected thereto. Accordingly, after the dielectric-strength test, the test switch is reliably activated.

According to a second aspect of the present invention, an earth leakage breaker has a function of protecting against over-current and ground failure. The earth leakage breaker includes a main contact, a switch mechanism, an operating handle, an over-current tripping device, and a leakage tripping device having a leakage detecting circuit with a zerophase current transformer disposed a main-body case. A test switch of a manually-operated type is provided for turning on and off a power-supply circuit between the leakage detecting circuit and the main circuit, so that the leakage detecting circuit is disconnected from the main circuit by turning off the switch when the dielectric-strength or withstand voltage test is conducted. The test switch is disposed in a space between the zero-phase current transformer in the main-body case and a sidewall of the main-body case.

According to the second aspect of the present invention, the test switch may have a manual operating section facing a window hole formed in an upper cover of the main-body case. The manual operating section is mechanically interconnected to a trip cross bar of the switch mechanism. When the test switch is turned OFF, the trip cross bar is driven to and held at a latch releasing position to open the main contact. The test switch may have the following configurations.

The test switch may be provided with an actuator at the manual operating section thereof as interconnecting means for interconnecting the test switch and the trip cross bar. The actuator is linked to an ON/OFF operation of the test switch, and is interconnected to the trip cross bar via an armature as an operating end of the over-current trip device.

The test switch may be provided with an actuator at the manual operating section thereof as interconnecting means for interconnecting the test switch and the trip cross bar. The actuator is linked to the ON/OFF operation of the test switch, and is interconnected to the trip cross bar via a slider as an operating end of a trip coil unit of the over-current trip device. The actuator described above may extend from the manual operating section of the test switch toward the trip cross bar.

In the second aspect of the present invention, when the test switch is turned off for the withstand voltage test, the leakage detecting circuit is disconnected from the main circuit. At this time, the trip cross bar is driven to the latch releasing position in response to the turning-off of the test switch, so that the switching mechanism performs the tripping operation to open the main contact. Accordingly, the breaker is ready for the withstand voltage test, and the withstand voltage test is conducted safely in a state that the leakage detecting circuit is disconnected from the main circuit.

When the test switch is turned off, the trip cross bar is held at the latch releasing position. Accordingly, even if the operating handle is operated to turn on the main contact without turning on the test switch, it is impossible to close the main contact since the switch mechanism is not reset. Therefore, after the withstand voltage test, if the test switch is not turned on and the leakage detecting circuit is still disconnected from the main circuit since the turning-on, it is not possible to close the main contact, so that the earth leakage breaker is not returned to the usage state.

Further, the test switch is disposed in the space between the zero-phase current transformer and the sidewall of the main-body case. The U-shaped main circuit conductor penetrated through the zero-phase current transformer surrounds front and rear sides of the space (where a leakage detecting circuit is disposed in a conventional earth leakage breaker). Accordingly, it is possible to provide the test switch in the main-body case without changing common components parts of the circuit breaker and the leakage breaker and a layout thereof.

DETAILED DESCRIPTION OF PREFERRED EMBODIMENTS

Figure 1:
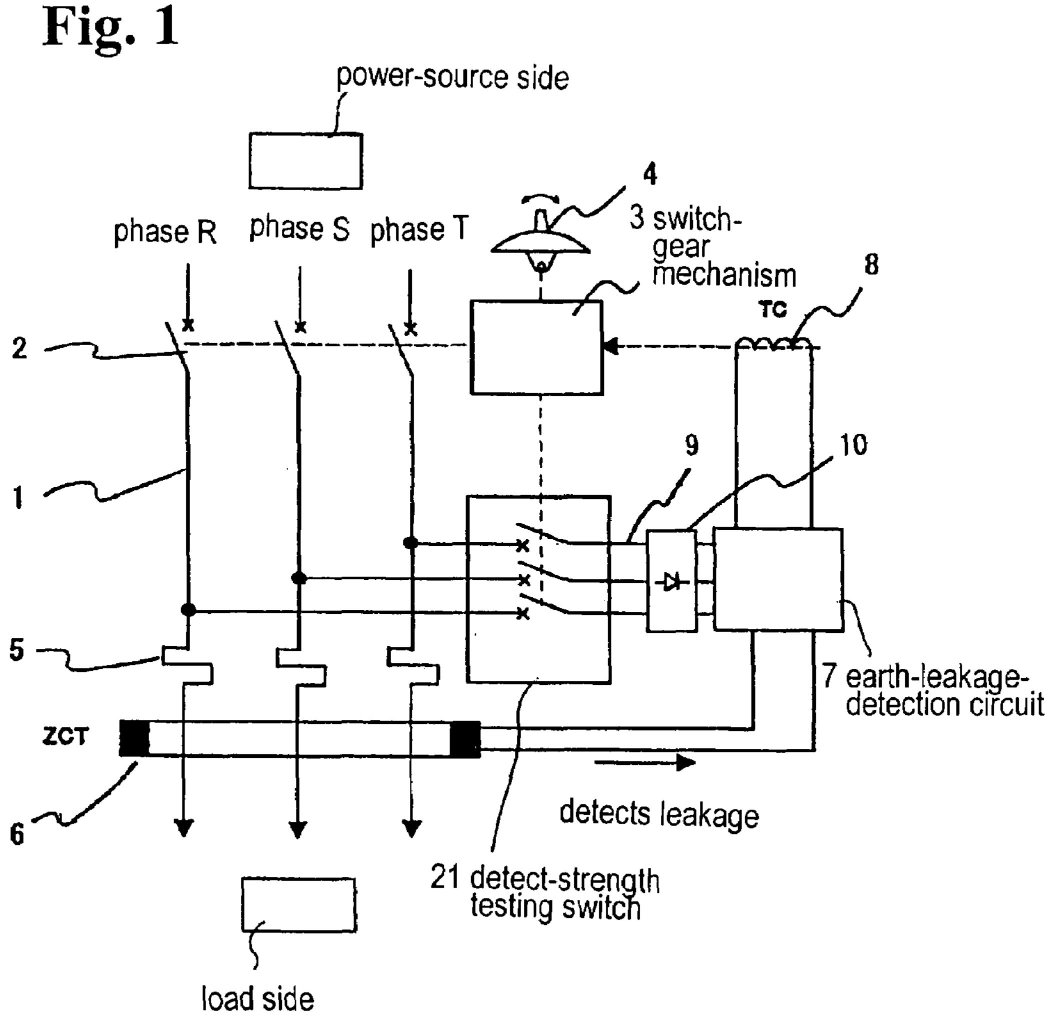
FIG. 1 is a schematic block diagram of a circuit of an earth leakage breaker according to a first aspect of the present invention.

Hereunder, embodiments of the present invention will be explained with reference to the accompanying drawings. Same reference numerals are used to designate same components shown in FIGS. 12 to 14, and descriptions thereof are omitted.

Figure 2:
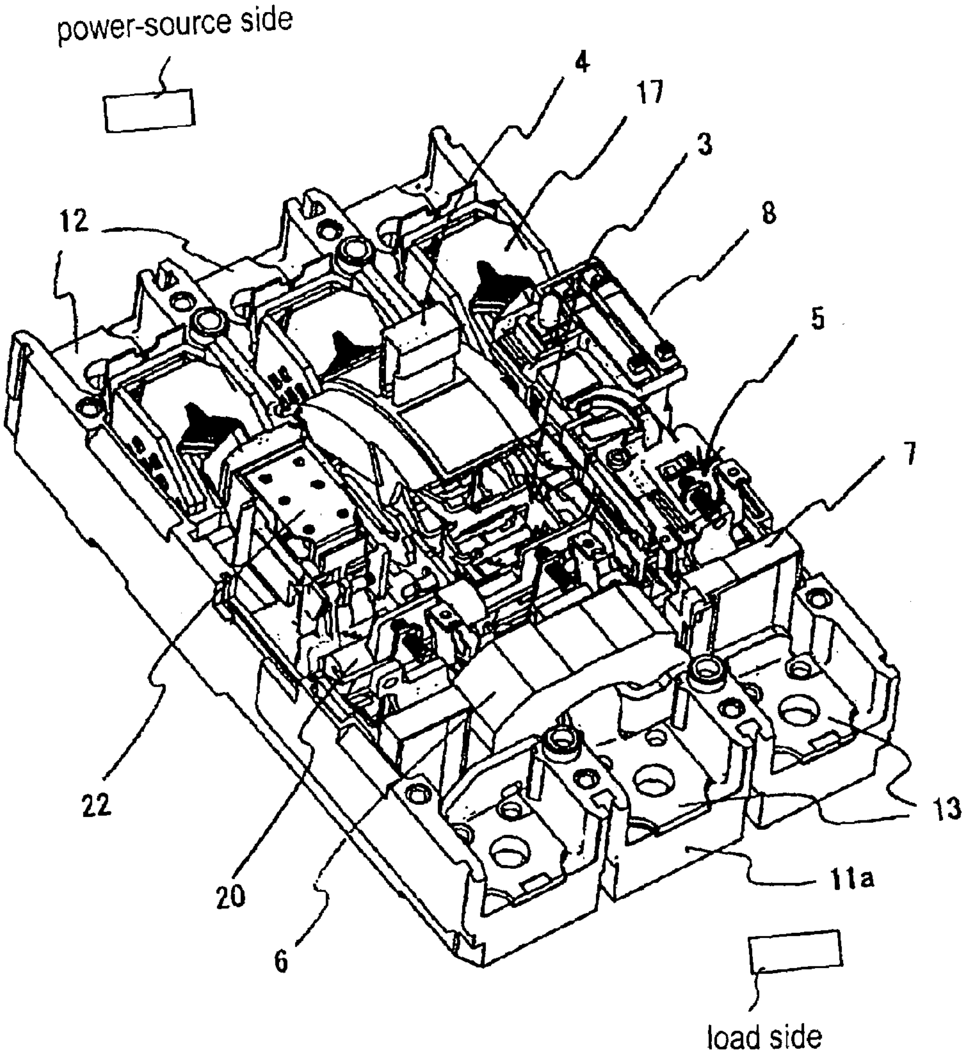
FIG. 2 is an exploded perspective view showing an interior mechanism of the earth leakage breaker according to the first aspect of the present invention, in which an auxiliary switch is employed as a test switch shown in FIG. 1.
Figure 3A:
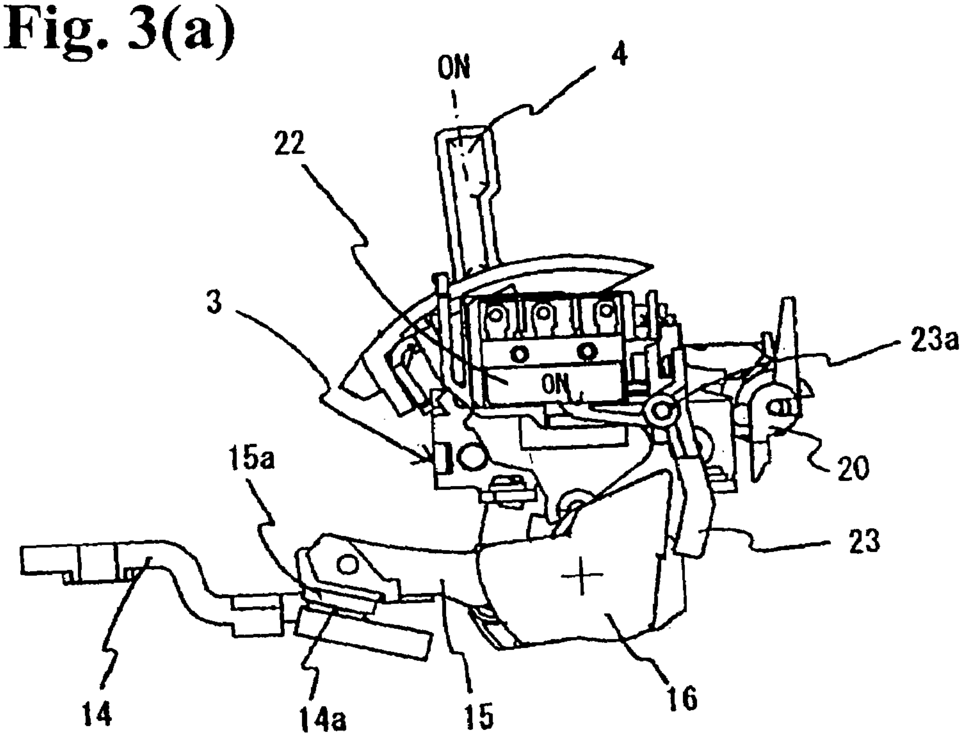
FIGS. 3(*a*) and 3(*b*) are views showing an operation of the auxiliary switch shown in FIG. 2, wherein FIG. 3(*a*) is a view corresponding to an ON position of a main contact, and FIG. 3(*b*) is a view corresponding to an OFF position of the main contact.
Figure 3B:
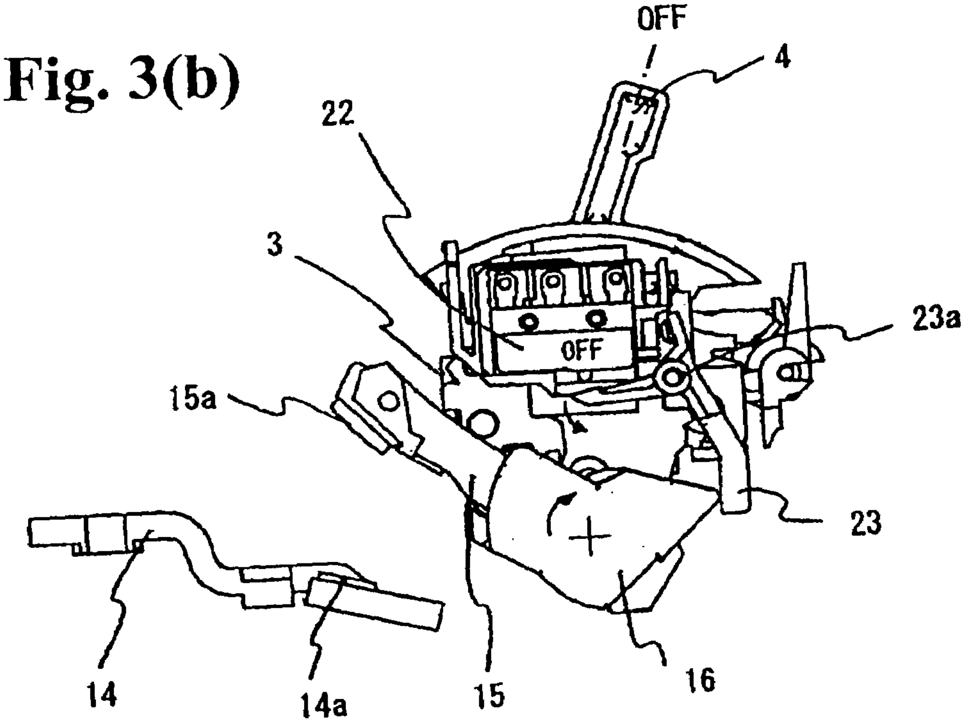

FIGS. 1 to 3(*a*) and 3(*b*) are views showing structural diagrams of an earth leakage breaker according to a first aspect of the present invention. The earth leakage breaker shown in FIGS. 1 to 3 has a structure substantially identical to those of conventional earth leakage breakers shown in FIGS. 12 to 14, in which power-supply lines 9 of a power-supply circuit are connected between a main circuit 1 and an earth-leakage-detection circuit 7. A difference is that a test switch 21 is disposed between the main circuit 1 and an earth-leakage-detection circuit 7.

The test switch 21 turns the power-supply circuit ON and OFF, and is linked to an opening and closing operation of main contacts 2. According to the embodiment, an auxiliary switch (described later) is installed in a main-body case 11 as an attachment of the earth leakage breaker. The power-supply lines 9 corresponding to phases R, S, and T are disposed between the main circuit 1 and the earth-leakage-detection circuit 7, and the three-phase power source is converted into DC current through a three-phase bridge rectifying circuit 10, so that the DC current is supplied to the earth-leakage-detection circuit 7. The test switch 21 has three contacts (micro-switches) corresponding to the power-supply lines 9.

Figure 12:
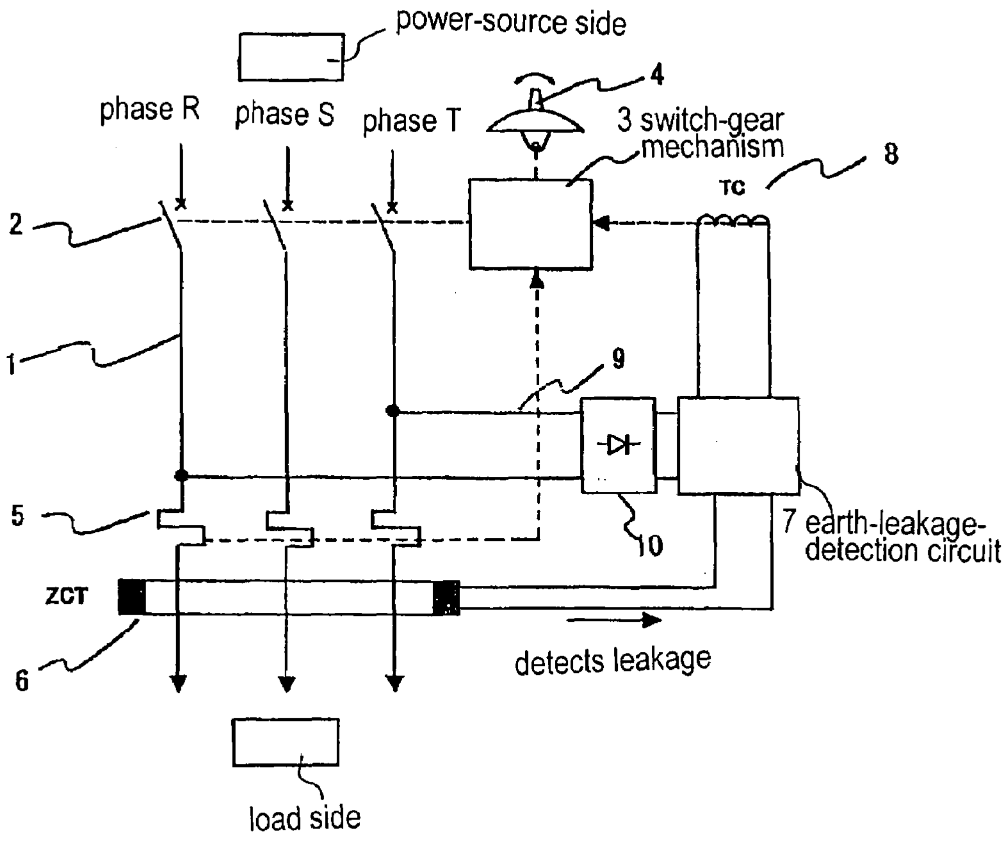
Fig. 12 Prior Art
FIG. 12 is a circuit diagram of a conventional earth leakage breaker.
Figure 13:
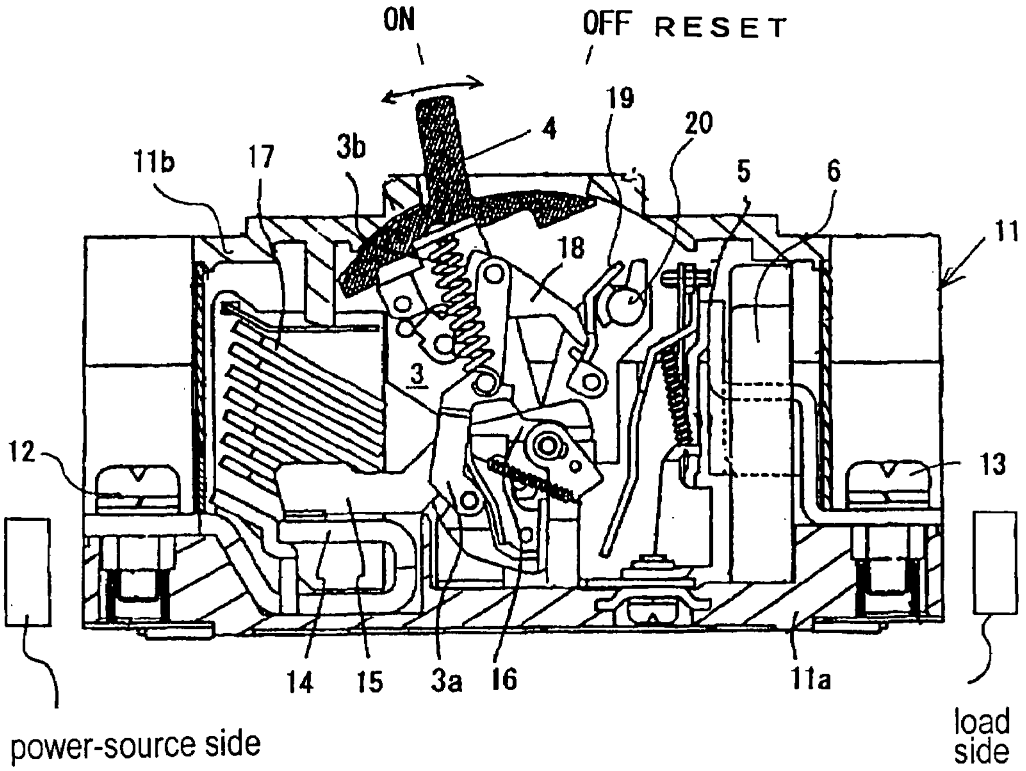
Fig. 13 Prior Art
FIG. 13 is a sectional view showing a structure of the earth leakage breaker shown in FIG. 12.

As shown in FIG. 1, the test switch 21 has the three contacts corresponding to the power-supply lines 9 of the phases R, S, and T. The test switch 21 may be provided with two contacts corresponding to two of the three phases. In a case of a two-phase power source as shown in FIG. 12, in which two power-supply lines 9 are connected between the main circuit 1 and the earth-leakage-detection circuit 7 to supply voltage between the R and T phases, the test switch 21 is provided with two contacts, or one contact on the phase R or T.

FIG. 2 is an exploded perspective view of the earth leakage breaker (with a top cover removed) having an auxiliary switch as the test switch 21. The auxiliary switch 22 is detachably attached to an attachment installation space in the main-body case at a lateral side of the operating handle 4. The auxiliary switch 22 is provided with three micro-switches corresponding to the three contacts of the test switch 21 shown in FIG. 1. The micro-switches perform ON/OFF operations according to an opening and closing operation of the main contacts (described later).

FIGS. 3(*a*) and 3(*b*) are views showing an operation and a mechanism of the auxiliary switch 22 (the test switch 21). As shown in FIGS. 3(*a*) and 3(*b*), the auxiliary switch 22 is provided with a lever-type actuator 23 with an axis 23*a* as a rotational center for interconnecting an operating end portion of the auxiliary switch 22 and a contact holder 16 of a movable contact 15. A tip portion of the actuator 23 faces the contact holder 16.

FIG. 3(*a*) is a view showing a closed state of the main contacts 2 (Refer to FIG. 1), in which a contact 15*a* of the movable contact 15 contacts a contact 14*a* of a stationary contact 14. In this state, the actuator 23 is away from the contact holder 16, and the micro-switches of the auxiliary switch 22 turn ON, so that the power-supply circuit of the earth-leakage-detection circuit 7 shown in FIG. 1 is in an electrically conductive condition.

From this state, when the operating handle 4, is moved from an ON position to an OFF position to open the main contacts for dielectric-strength test, a toggle-link mechanism of the switch mechanism 3 is reversed to open the movable contact 15. Linked to this movement, a rear end portion of the contact holder 16 pushes the actuator 23. As a result, the actuator 23 is rotated counterclockwise to move away from the auxiliary switch 22, and the micro-switches of the auxiliary switch 22 turn OFF. Accordingly, the test switch 21 shown in FIG. 1 opens, thereby disconnecting the power-supply circuit of the earth-leakage-detection circuit 7 from the main circuit 1. In this state, the dielectric-strength test under can be conducted while the earth-leakage-detection circuit 7 is protected from damage by the test voltage.

After the dielectric-strength test, when the operating handle 4 returns to the ON position as shown in FIG. 3(*a*) to close the main contacts, the contact holder 16 is rotated counterclockwise to move away from the actuator 23. The auxiliary switch 22 automatically returns to the ON state, so that the earth-leakage-detection circuit 7 returns to a normal condition and receives power from the main circuit 1.

In the embodiment described above, the auxiliary switch 22 is used as the test switch 21, and the earth leakage breaker has a simple structure without significant change. In the structure shown in FIG. 2, the auxiliary switch 22 is disposed in the attachment installation space in the main-body case 11. A location of installation of the auxiliary switch is not limited thereto, and the auxiliary switch 22 may be installed on an external side of the main-body case as far as a location is close to the tripping cross bar.

Figure 4:
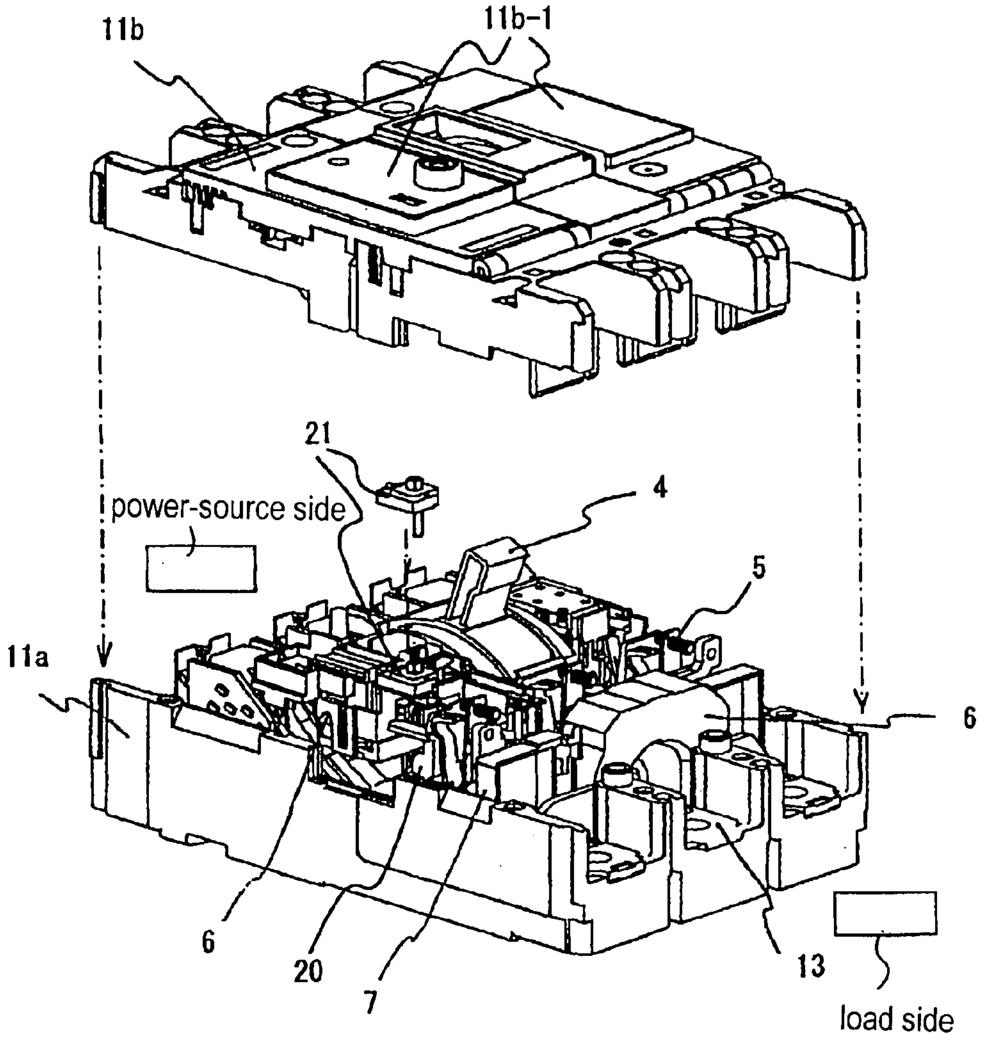
FIG. 4 is an exploded perspective view of an earth leakage breaker according to the first aspect of the present invention, in which a manually operable switch is employed as the test switch shown in FIG. 1.
Figure 5A:
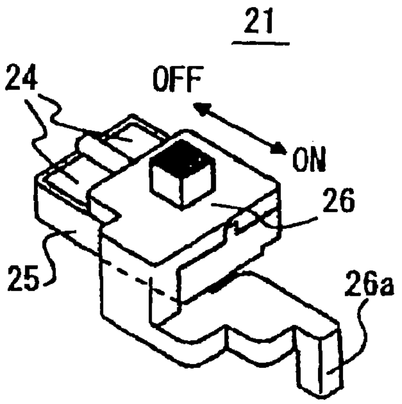
FIGS. 5(*a*) and 5(*b*) are views showing a structure of the test switch shown in FIG. 4; wherein FIG. 5(*a*) is a perspective view in an assembled state, and FIG. 5(*b*) is a perspective view in an exploded state.
Figure 5B:
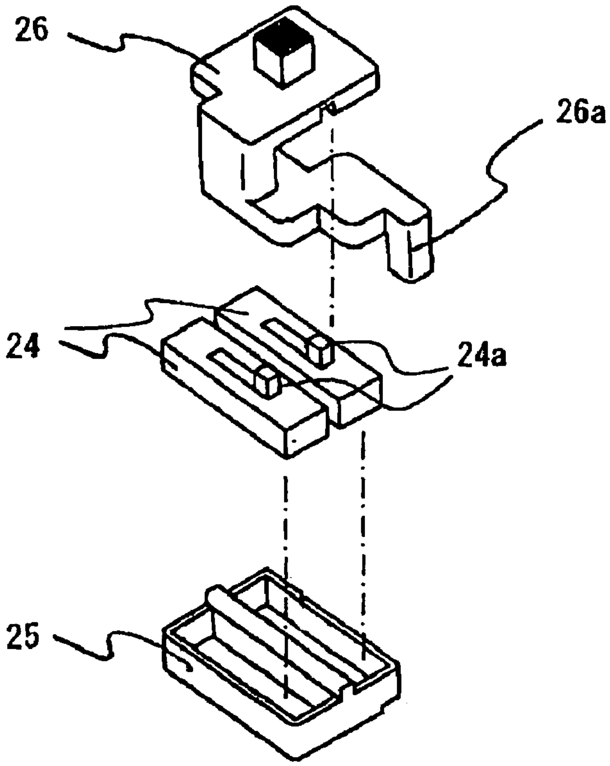
Figure 6A:
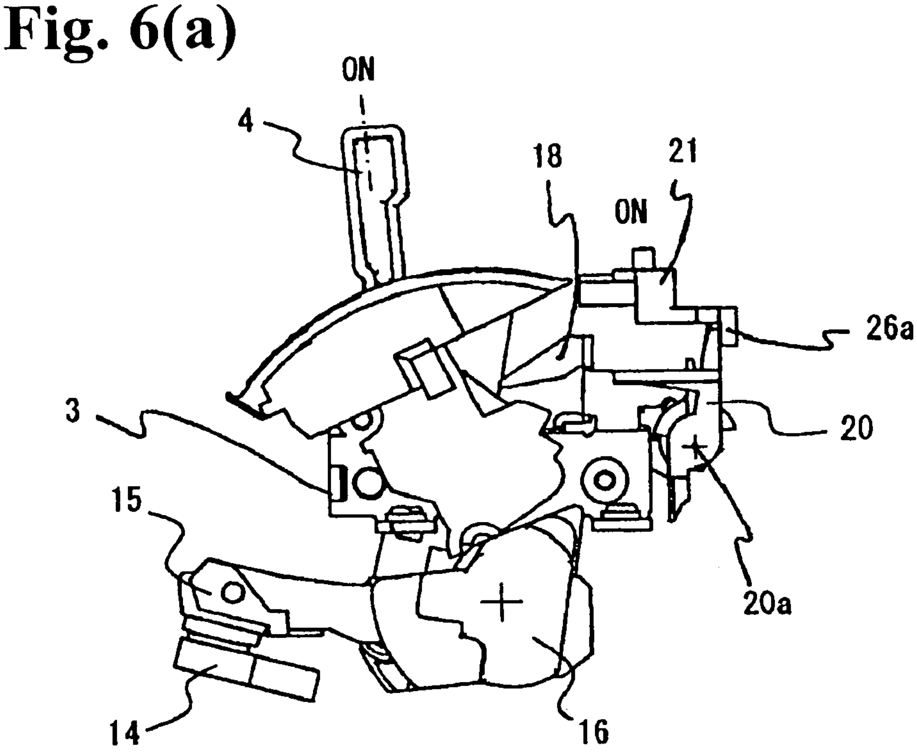
FIGS. 6(*a*) and 6(*b*) are views showing a link structure between the test switch shown in FIGS. 5(*a*) and 5(*b*) and a switch mechanism of the breaker, and showing an opening and closing operation thereof, wherein FIG. 6(*a*) is a view corresponding to an ON position of the test switch, and FIG. 6(*b*) is a view corresponding to an OFF position of the test switch.
Figure 6B:
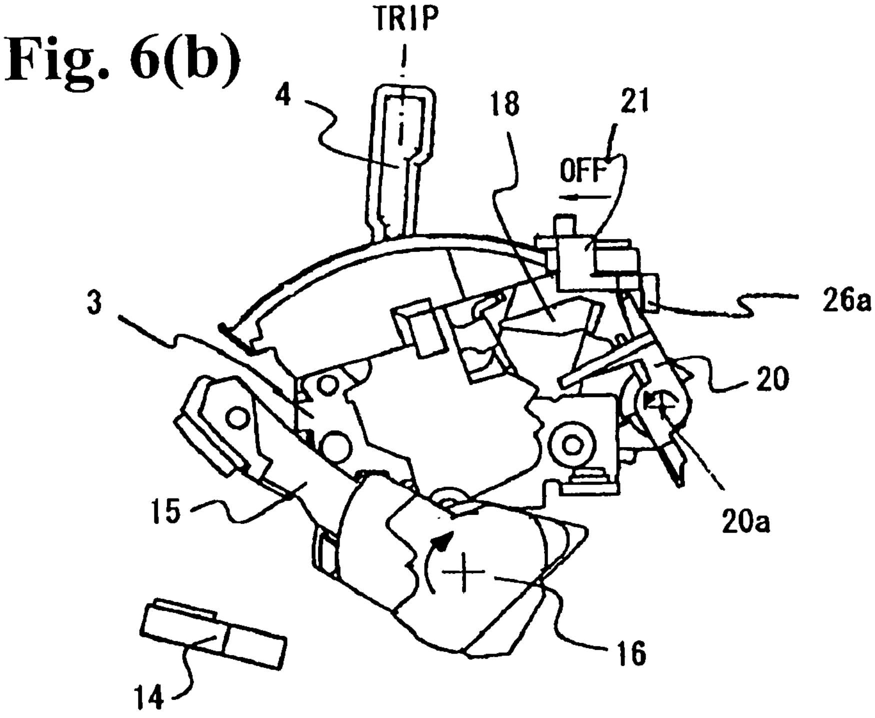

FIGS. 4 to 6 are views showing a structure and operation of another earth leakage breaker according to the first aspect of the present invention. In this embodiment, the test switch 21 shown in FIG. 1 has an improved function. The test switch 21 is a manually operable switch, and is linked to a tripping cross bar of the switch mechanism 3 (described later). When the test switch 21 is manually turned OFF for the dielectric-strength test, the power-supply circuit of the power-supply line 9 between the main circuit 1 and the earth-leakage-detection circuit 7 is disconnected. At this time, the switch mechanism 3 performs the tripping operation to open the main contacts 2 for the dielectric-strength test. After the dielectric-strength test, when the earth leakage breaker returns to the normal condition, unless the test switch 21 is returned to the ON position or the operating handle 4 is moved to the RESET position, the latching mechanism is not reset and the main contacts 2 are not connected. Accordingly, it is possible to confirm that the test switch 21 is turned ON.

As shown in FIG. 4, the manual operable test switch 21 is attached at a lateral side of the operating handle 4 and above the tripping cross bar 20 of the switch mechanism. An upper-cover member 11*b* of the main-body case is provided with a sliding-type small-cover member 11-*b*1, so that the test switch 21 can turned ON and OFF through an external operation.

FIGS. 5(*a*) and 5(*b*) are views showing a structure of the test switch 21. The test switch 21 comprises multiple slide switches 24 corresponding to the number of the contacts; a dish-shaped switch case 25 for accommodating the slide switches 24 side by side; and a slide-switch cover 26 covering the switch case 25 and engaging operating knobs 24*a* of the slide switches 24 for turning the slide switches 24 ON and OFF all at once. The switch cover 26 is integrated with an actuator 26*a* with a leg shape extending downwardly. In FIG. 5(*b*), the earth leakage breaker has two slide switches 24 for the three phases, and may have a single slide switch for a single phase.

The test switch 21 is attached at a position shown in FIG. 4, so that a tip portion of the actuator 26*a* faces the tripping cross bar of the switch mechanism, and the actuator 26*a* is interconnected to the tripping cross bar 20 as shown in FIGS. 6(*a*) and 6(*b*).

In the test switch 21 shown in FIGS. 5(*a*) and 5(*b*), when the switch cover 26 is slid to the right to hold the slide switch 24 at the ON position and the operating handle 4 is moved to the ON position, the movable contact 15 is closed and the main circuit 1 is in the electrically conductive normal state as shown in FIG. 6(*a*). That is, the contacts of the test switch 21 shown in FIG. 1 are closed, and the power is supplied from the main circuit 1 to the earth-leakage-detection circuit 7 via the power-supply lines 9. In this state, as shown in FIG. 6(*a*), the actuator 26*a* does not constrain the tripping cross bar 20, so that the tripping cross bar 20 holds the latch unit 18 of the switch mechanism 3.

From this state, the switch cover 26 of the test switch 21 is moved to the OFF position through an external manual operation to conduct the dielectric-strength test. Accordingly, the contacts of the slide switch 24 are turned OFF, thereby disconnecting the power-supply circuit of the earth-leakage-detection circuit 7 from the main circuit 1. At the same time, as shown in FIG. 6(*b*), the actuator 26*a* of the switch cover 26 pushes a backside of the tripping cross bar 20, so that the tripping cross bar 20 is rotated counterclockwise around the axis 20*a*. Accordingly, the latch unit 18 is released from the tripping cross bar 20, and the switch mechanism 3 performs the tripping operation to open the movable contact 15 and turn the main contacts 2 OFF. In this state, the earth-leakage-detection circuit 7 is disconnected from the main circuit 1. Therefore, the earth-leakage-detection circuit 7 is securely protected from the high voltage applied between the phases of the main circuit 1, and the dielectric-strength test can be conducted safely.

In the state shown in FIG. 6(*b*) in which the test switch 21 is moved to the OFF position, the tripping cross bar 20 pushed by the actuator 26*a* of the switch 21 is held at the release position of the latch unit 18. Accordingly, after the dielectric-strength test, unless the test switch 21 is returned to the ON position, even if the operating handle 4 is moved from the tripping position to the RESET position, the latching mechanism is not reset and the main contacts 2 are not closed. Therefore, it is possible to prevent the earth leakage breaker from being used without protective function against leakage and ground failure since the test switch 21 is not turned ON.

The tripping cross bar 20 of the switch mechanism 3 is urged clockwise toward the position (reset position) engaging the latch unit 18 with a relatively weak force of a return spring (not shown). When the slide switch 24 is retained at the ON/OFF position shown in FIG. 4 with a mechanical force greater than the force of the return spring urging the tripping cross bar 20, in a state that the test switch 21 is moved to the OFF position through an external operation, the tripping cross bar 20 is held at the latch release position against the force of the return spring.

Accordingly, after the dielectric-strength test, unless the test switch 21 is returned to the ON position from the OFF position, the tripping cross bar 20 does not return to the original position. As a result, even if the operating handle 4 is moved to the RESET position from the TRIP position, the latch unit 18 is not reset, and the contact of the main circuit 1 is not turned on. With this arrangement, when the earth leakage breaker is returned to the electrically conductive condition after the dielectric-strength test, it is possible to confirm that the test switch 21 is turned ON.

As described above, the slide switch 24 is retained at the ON/OFF position shown in FIG. 4 with a mechanical force greater than the force of the return spring urging the tripping cross bar 20. Alternatively, the interconnecting mechanism may be modified. That is, when the test switch 21 is moved to the OFF position, the testing switch 21 is held at the OFF position. After the dielectric-strength test, when the operating handle 4 is moved from the TRIP position to the RESET position, in linkage with this action, the tripping cross bar 20 is returned to the RESET position. At this time, it may be arranged such that the test switch 21 is returned to the ON position with the force of the return spring of the tripping cross bar 20. With this arrangement, when the earth leakage breaker is returned to the electrically conductive condition after the dielectric-strength test, it is possible to confirm that the test switch 21 is turned ON.

In the embodiments described above, the slide switch 24 is used as the test switch 21. However, it is not limited to the slide switch 24, and a toggle switch may be used.

As described above, according to the first aspect of the present invention, the earth leakage breaker has protective functions against over-current and ground failure. The earth leakage breaker includes the main contacts, the switch mechanism, the operating handle, the over-current tripping device, the leakage tripping device having the earth-leakage-detection circuit and is disposed in the main-body case. The power source of the earth-leakage-detection circuit is supplied via the power-supply line connected to the main circuit.

The test switch is linked to the ON/OFF operation of the main contacts and is provided for turning on and off the power-supply circuit of the power-supply line.

Alternatively, the earth leakage breaker further includes a switch for testing dielectric strength which disconnects the power source line. The switch for testing dielectric strength is constituted of a manually operable switch for testing dielectric strength, is connected to the respective lines or the respective lines excluding one line of the power source lines, and collectively turns the powersource lines ON and OFF. Alternatively, the earth leakagebreaker includesa manually operable switch for testing dielectric strength which turns on or off a power supply circuit of the power source line, and the switch for testing dielectric strength interrupts the power supply to the main circuit when the switch for testing dielectric strength is held at the OFF position. Further, the earth leakage breaker also provides the switch for testing dielectric strength which turns the power-supply circuit of the power-supply line ON and OFF so as to enable the switch-gear mechanism to execute the tripping operation in linkage with the turn-OFF operation of the dielectric-strength testing switch, thereby causing the main contact to open.

With the above arrangement, after a manufacture ships the product, the dielectric-strength test is safely conducted with the simple operation. After the dielectric-strength test, the operating handle is operated to activate the main contacts, so that the earth leakage breaker returns to a normal use condition. Simultaneously, in linkage with this action, the test switch automatically returns to the ON position. When the manually operable test switch is moved from the OFF position to the ON position or moved to the RESET position, the main contacts are turned on.

Therefore, after the dielectric-strength test, when the earth leakage breaker is restored to the normal condition, it is possible to prevent the earth leakage breaker from being used without protective function against leakage and ground failure since the test switch 21 is not turned ON.

With reference to FIGS. 7 to 11(*a*) and 11(*b*), an earth leakage breaker according to a second aspect of the present invention will be explained. The earth leakage breaker shown in FIGS. 7 to 11(*a*) and 11(*b*) has a structure substantially identical to those of conventional earth leakage breakers shown in FIGS. 12 to 14, in which power-supply lines 9 of a power-supply circuit are connected between a main circuit 1 and an earth-leakage-detection circuit 7. A difference is that a test switch 21 is disposed between the main circuit 1 and an earth-leakage-detection circuit 7.

In the circuit diagram shown in FIG. 1, the power-supply lines 9 corresponding to phases R, S, and T are disposed between the main circuit 1 and the earth-leakage-detection circuit 7, and the three-phase AC power source is converted into DC current through a three-phase bridge rectifying circuit 10, so that the DC current is supplied to the earth-leakage-detection circuit 7. The test switch 21 has three contacts (micro-switches) corresponding to the power-supply lines 9. The test switch 21 may be provided with two contacts corresponding to two of the three phases. In a case of a two-phase power source as shown in FIG. 12, in which two power-supply lines 9 are connected between the main circuit 1 and the earth-leakage-detection circuit 7 to supply voltage between the R and T phases, the test switch 21 is provided with two contacts, or one contact on the phase R or T. In a case of an earth leakage breaker for a single phase, it suffices that the test switch 21 is provided with only one contact.

Figure 7:
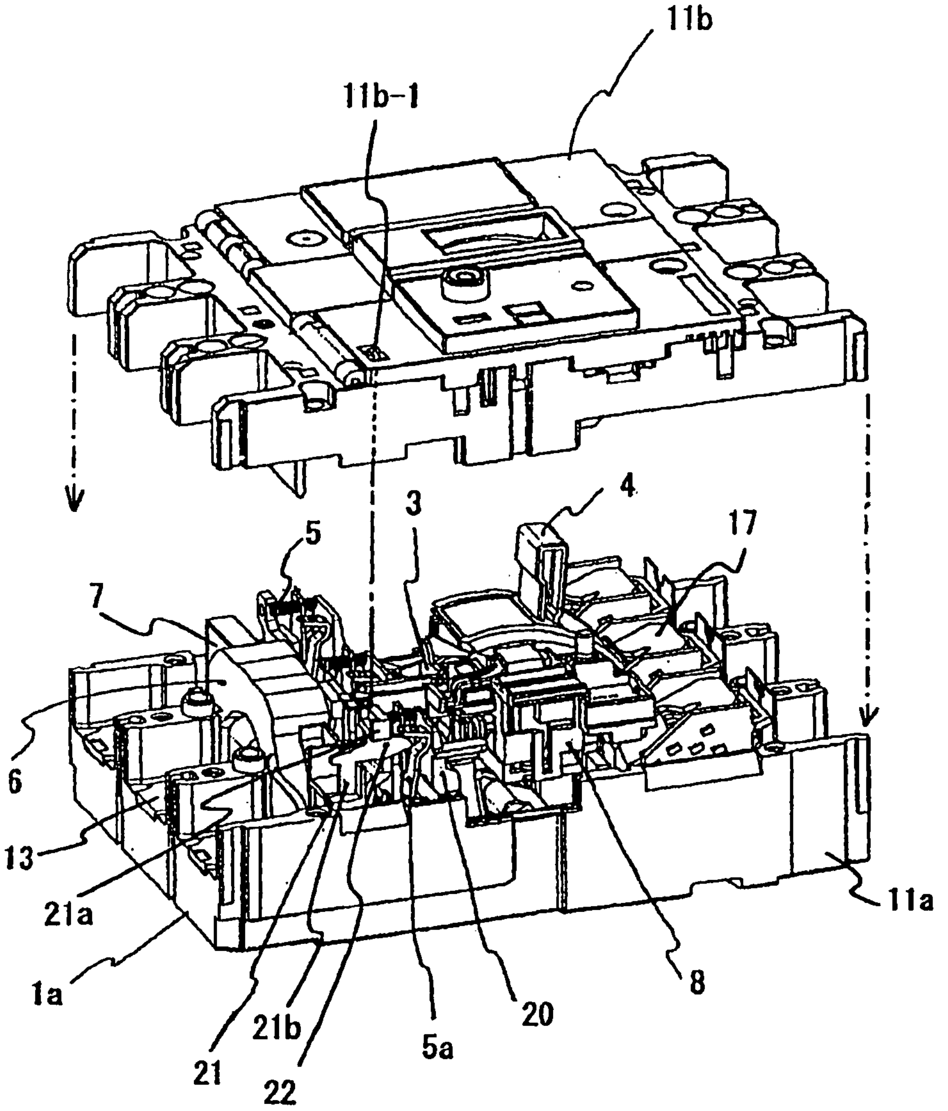
FIG. 7 is a perspective view showing a structure of an earth leakage breaker according to a second aspect of the present invention.
Figure 8A:
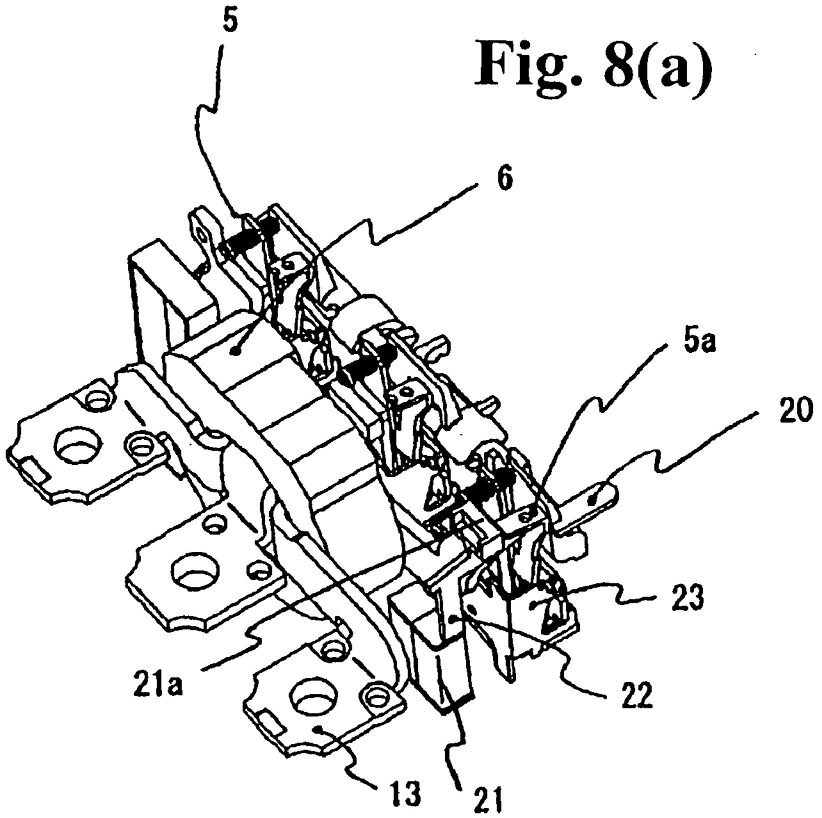
FIGS. 8(*a*) and 8(*b*) are views showing an operation of an essential mechanism of the earth leakage breaker when a test switch shown in FIG. 7 is turned on, in which FIG. 8(*a*) is a perspective view thereof, and FIG. 8(*b*) is a side view thereof.
Figure 8B:
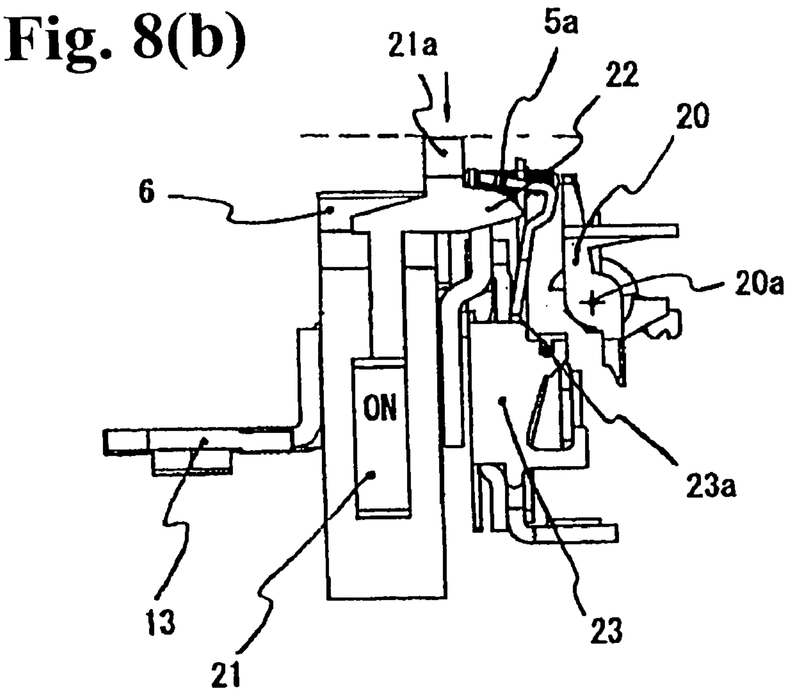

FIG. 7 shows a structure of the earth leakage breaker with the test switch 21, and FIGS. 8(*a*) and 8(*b*) are views showing an operation of the test switch 21 for the dielectric-strength test or withstand voltage test.

Figure 14:
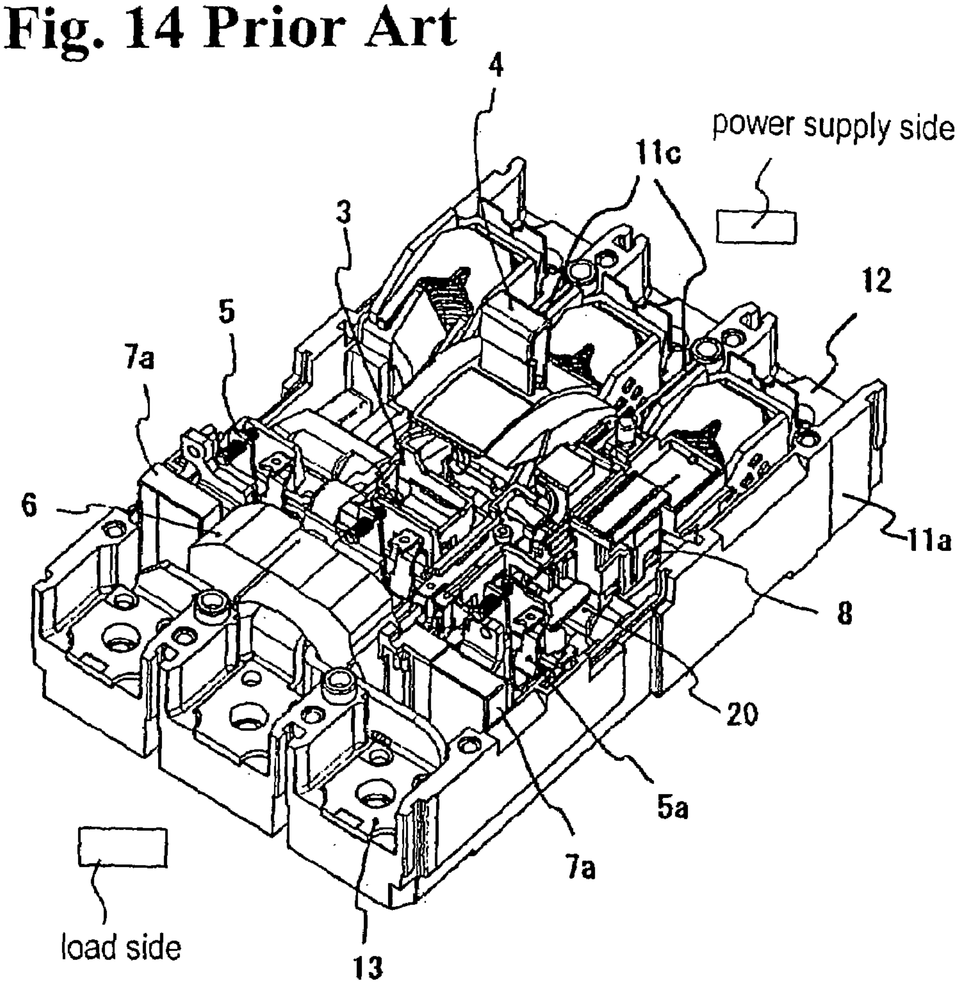
Fig. 14 Prior Art
FIG. 14 is a perspective view showing the structure of the earth leakage breaker shown in FIG. 12.

In FIG. 7, the test switch 21 is a holding switch (held at an ON position by a first depression, and returned to an OFF position by a second depression) provided with a push button 21*a*. The test switch 21 is disposed in a space in the main-body case, where a print circuit board 7*a* of the leakage detection circuit shown in FIG. 14 is disposed. The space is surrounded by the zero-phase current transformer 6 provided in the main-body case, conductors of the main circuit 1 penetrated through the zero-phase current transformer 6 and arranged around the main-body case, and a sidewall of the lower case 11*a*. A conductor of the T phase at the foremost position among the R, S, and T phases is curved in a U-shape so as to penetrate through the zero-phase current transformer 6. At this position, an operating knob (push button) 21*a* attached at an end of an operating rod 21*b* extending upward from a main body of the test switch 21 faces a window hole 11*b*-1 formed in an upper cover 11*b* of the main-body case.

As described above, the test switch 21 is disposed in the space between the zero-phase current transformer 6 and the sidewall of the lower case 11*a* and surrounded by the main circuit conductors curved in a U-shape at front and rear sides thereof. Accordingly, it is possible to additionally provide the test switch 21 in the main-body case only by slightly modifying the print board 7*a* without changing the components and layout of the earth leakage breaker shown in FIG. 14. Further, the space extends from the upper cover 11*b* of the main-body case to a bottom of the lower case 11*a*. Accordingly, it is possible to secure a sufficient insulation distance between a surface of the upper cover 11*b* and internal contacts (charging section) of the test switch 21, so that the leakage detecting circuit 7 is safely protected during the withstand voltage test.

The operating rod 21*b* of the test switch 21 is provided with an actuator 22 extending toward the trip cross bar 20 of the switching mechanism 3 (described later). When the test switch 21 is turned off, the main contacts 2 (refer to FIG. 1) of the earth leakage breaker is forced to open via the actuator 22.

FIGS. 8(*a*) and 8(*b*) are views showing a normal state in which the test switch 21 is turned on by pushing the operating rod 21*a* thereof. In this state, the push button 21*a* is receded in the window hole 11*b*-1 (refer to FIG. 7) formed in the upper cover 11*b* of the main-body case, and the actuator 22 as well as the operating rod 21*b* are receded to an unlocked position away from the armature 5*a* of the over-current trip device 5. In this state, the contacts of the test switch 21 shown in FIG. 1 are turned on, and the power is supplied from the main circuit 1 to the leakage detecting circuit 7 via the power supply lines 9. In FIGS. 8(*a*) and 8(*b*), the trip cross bar 20 is supported on a pivot 20*a*, a support guide 23 supports the armature 5*a*, and the armature 5*a* is supported on a part 23*a*.

Figure 9A:
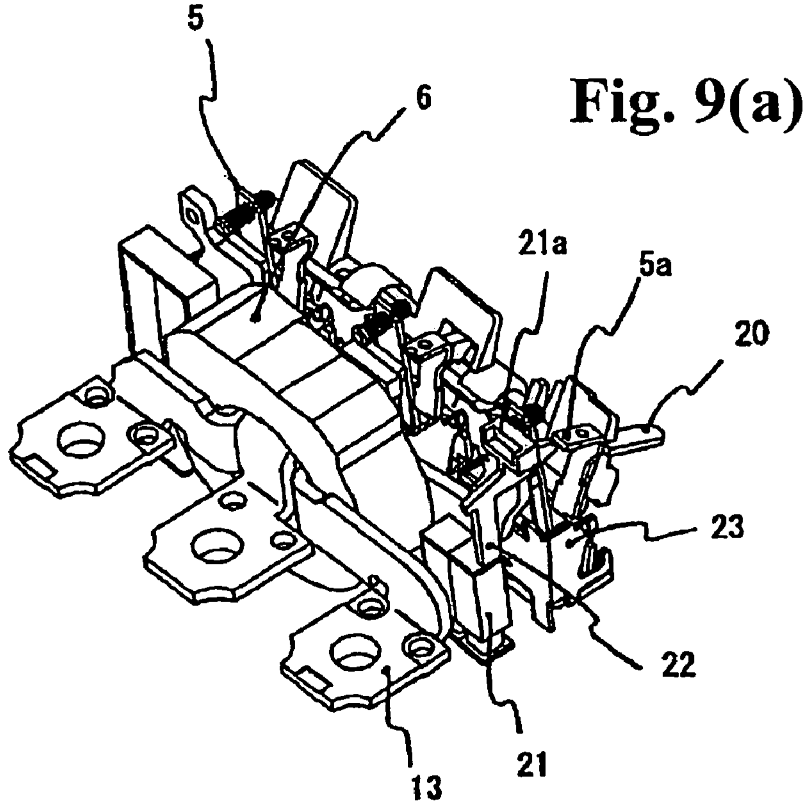
FIGS. 9(*a*) and 9(*b*) are views showing an operation of the essential mechanism of the earth leakage breaker when the test switch shown in FIG. 7 is turned off, in which FIG. 8(*a*) is a perspective view thereof, and FIG. 8(*b*) is a side view thereof.
Figure 9B:
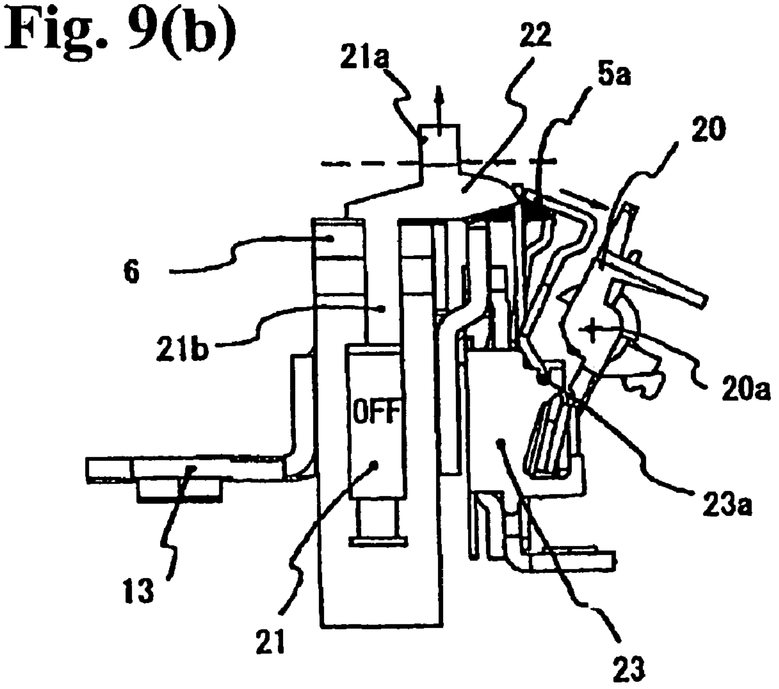

When the withstand voltage test is conducted, the operating knob 21*a* of the test switch 21 is turned off first as shown in FIGS. 9(*a*) and 9(*b*). The operating knob 21*a* of the test switch 21 protrudes from the window hole 11*b*-1 of the upper cover 11*b* (refer to FIG. 7), and the actuator 22 is driven by the turning-off of the operating knob 21*b* to move up to thrust an end of the armature 5*a* of the over-current trip device 5. Accordingly, the contacts of the test switch 21 are opened to disconnect the leakage detecting circuit 7 from the main circuit 1 (refer to FIG. 1). At this time, the armature 5*a* of the over-current trip device 5 rotates clockwise in response to the operation of the test switch 21 and pushes the trip cross bar 20 to the latch releasing position. As a result, the switching mechanism 3 performs the tripping operation to open the moving contact 15 of the main circuit contact, so that it is ready to conduct the withstand voltage test.

After the withstand voltage test, when the test switch 21 is manually returned to the ON position, the actuator 22 moves down as shown in FIGS. 8(*a*) and 8(*b*) to release the armature 5*a* of the over-current trip device 5. The operating handle 4 (refer to FIG. 13) of the earth leakage breaker at the trip position is returned to the reset position once and is turned to the ON position, so that the main contacts are closed to return the earth leakage breaker to the normal usage state. In this case, unless the test switch 21 is returned to the ON position, the switching mechanism 3 is not reset and the main circuit contacts 1 is not turned on even if the operating handle 4 is moved from the trip position to the OFF position. Therefore, it is possible to prevent the earth leakage breaker from being used without protective function against leakage and ground failure since the test switch 21 is not turned ON.

Figure 10A:
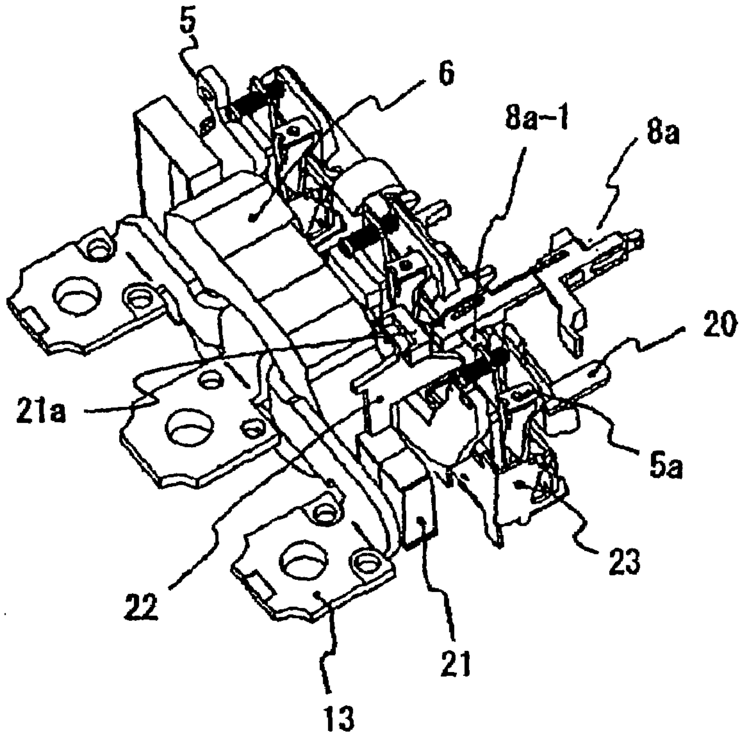
FIGS. 10(*a*) and 10(*b*) are views showing an operation of an essential mechanism of an earth leakage breaker when a test switch is turned on, in which FIG. 10(*a*) is a perspective view thereof, and FIG. 10(*b*) is a side view thereof.
Figure 10B:
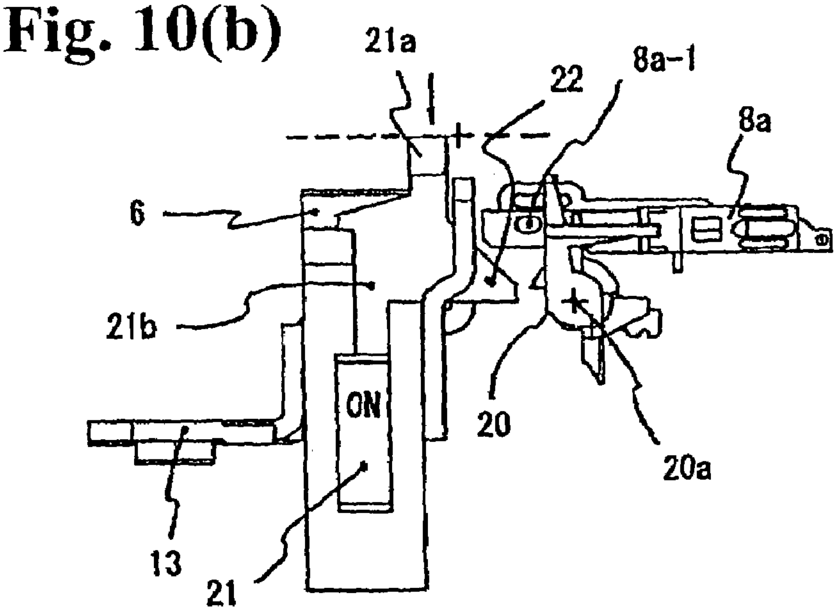

With reference to FIGS. 10(*a*), 10(*b*) and 11(*a*), 11(*b*), a structure and operation of an earth leakage breaker according to a further embodiment will be explained. In the previous embodiment, the actuator 22 is provided at the operating rod 21*b* of the test switch 21, and is interconnected to the armature 5*a* as the operating end of the over-current trip device 5, so that the trip cross bar 20 is driven to the latch releasing position via the armature 5*a*. In the present embodiment, the actuator 22 provided at the test switch 21 is interconnected to a slider 8*a*, i.e. an operating end of the trip coil unit 8 (refer to FIGS. 12 and 14) of the over-current trip device 5, so that the trip cross bar 20 is driven to the latch releasing position via a protrusion 8*a*-1 formed on the slider 8*a*.

That is, the actuator 22 protrudes from the operating rod 21*b* of the test switch 21 toward the trip cross bar 20, and is provided with a tilted cam face as shown in FIGS. 10(*a*), 10(*b*) and 11(*a*), 11(*b*). An end of the slider 8*a* faces the tilted cam face. FIGS. 10(*a*) and 10(*b*) are views showing a steady state in which the operating rod 21*a* of the test switch 21 is returned to the ON position. In this state, similar to FIGS. 8(*a*) and 8(*b*), the operating rod 21*a* is receded in the window hole 11*b*-1 (refer to FIG. 7) formed in the upper cover 11*b* of the main-body case, and the actuator 22 and the operating rod 21*b* are receded to the unlocked position away from the armature 5*a* of the over-current trip device 5.

Figure 11A:
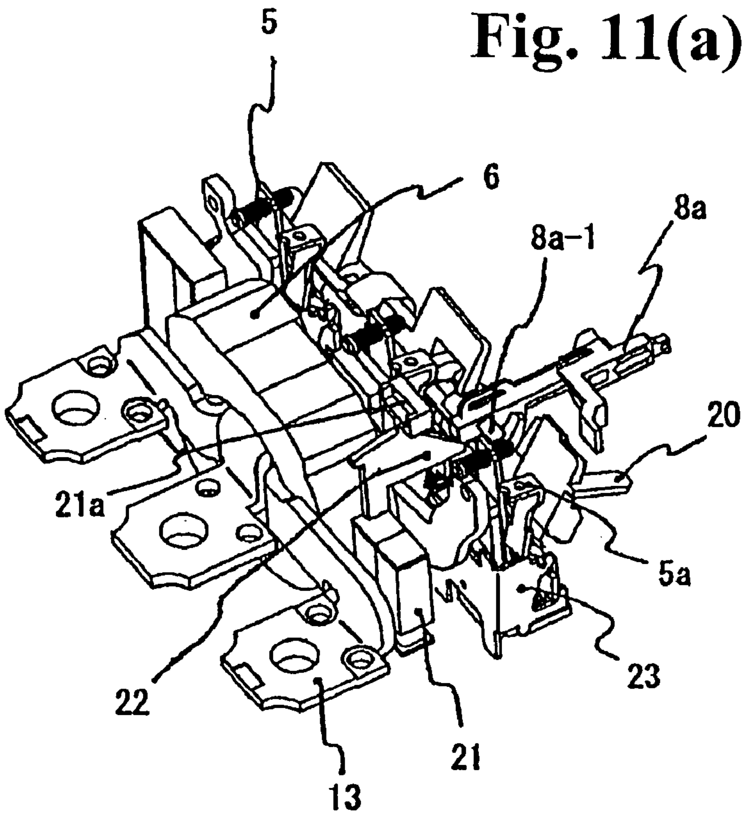
FIGS. 11(*a*) and 11(*b*) are views showing an operation of the essential mechanism of the earth leakage breaker when the test switch is turned off, in which FIG. 11(*a*) is a perspective view thereof, and FIG. 11(*b*) is a side view thereof.
Figure 11B:
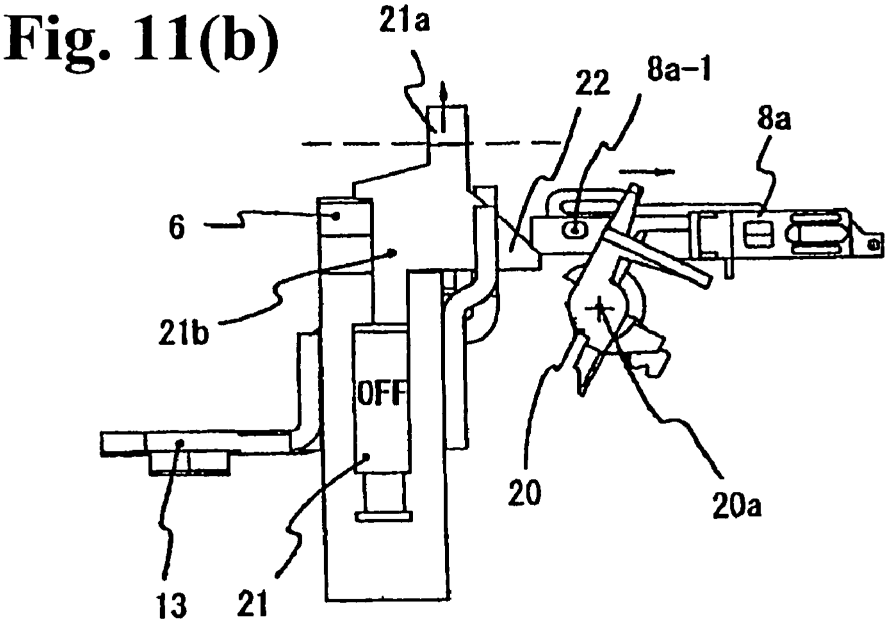

When the withstand voltage test is conducted from this state, the test switch 21 is manually turned off. FIGS. 11(*a*) and 11(*b*) are views showing an operation of the essential mechanism of the earth leakage breaker when the test switch 21 is turned off. In this state, the push button 21*b* of the test switch 21 protrudes from the window hole 11*b*-1 of the upper cover 11*b* (refer to FIG. 7). The actuator 22 is driven by the movement of the push button 21*b* to move up, and the tilted cam surface thereof pushes the end of the slider 8*a* to move in the arrow direction. Accordingly, the contacts of the test switch 21 are opened to disconnect the leakage detecting circuit 7 from the main circuit 1 (refer to FIG. 1), and the protrusion 8*a*-1 of the slider 8*a* pushes the trip cross bar 20 to rotate to the latch releasing position. As a result, the latch 18 (refer to FIG. 12) held by the trip cross bar 20 is released, so that the switching mechanism 3 performs the tripping operation, and the moving contact 15 are opened to turn off the main circuit contact 2 (refer to FIG. 1). Since the leakage detecting circuit 7 is disconnected from the main circuit 1, the withstand voltage test is safely conducted while the earth leakage breaker 7 is protected from the test voltage applied to the phases of the main circuit 1.

In the state shown in FIG. 6(*b*) in which the push button 21*a* of the test switch 21 is pulled up to the OFF position, the actuator 22 holds the trip cross bar 20 at the releasing position for the latch 18 via the slider 8*a*. Therefore, unless the test switch 21 is returned to the original ON position after the withstand voltage test, the switching mechanism 3 is not reset and the main circuit contacts 2 is not turned on even if the operating handle 4 is moved from the trip position to the OFF position.

As described above, according to the present invention, the earth leakage breaker has the over-current protecting function and the ground fault protecting function. The earth leakage breaker is constructed such that the contact of the main circuit, the switching mechanism, the operating handle, the over-current trip device, and the leakage detecting circuit combined with the zero-phase current transformer are mounted inside the main-body case. The manually-operated test switch turns off the circuit between the leakage detecting circuit and the main circuit to disconnect the leakage detecting circuit from the main circuit when the withstand voltage test is conducted.

The test switch is disposed in the space between the zero-phase current transformer provided in the main-body case for the earth leakage breaker and the sidewall of the main-body case. The test switch is mechanically interconnected to the trip cross bar of the switching mechanism. The trip cross bar is driven to and held at the latch releasing position when the test switch is turned off to open the contact of the main circuit. Accordingly, after the earth leakage breaker is shipped, it is possible to safely conduct the withstand voltage test through turning off the manually operable test switch provided in the main-body case without opening the main-body case of the breaker to disconnect the power supply line of the leakage detecting circuit from the main circuit.

After the withstand voltage test, when the earth leakage breaker is returned to the normal state, the main circuit contact is not turned on unless the test switch is returned to the ON state. Therefore, it is possible to prevent the earth leakage breaker from being used without protective function against leakage and ground failure since the test switch 21 is not turned ON.

Further, the test switch is disposed in the space between the zero-phase current transformer and the sidewall of the main-body case. Therefore, it is possible to provide the test switch in the main-body case without changing the common parts of the circuit breaker and the layout thereof.

While the invention has been explained with reference to the specific embodiments of the invention, the explanation is illustrative and the invention is limited only by the appended claims.

What is claimed is:

1. An earth leakage breaker for protecting a main circuit against over-current and ground failure, comprising:

a main-body case, a main contact disposed in the main-body case, a switch mechanism disposed in the main-body case and connected to the main contact for turning on and off the same, an operating handle attached to the switch mechanism for operating the switch mechanism, a leakage tripping device disposed in the main-body case for performing a tripping operation, an over-current tripping device disposed in the main-body case for performing a tripping operation, a leakage-detection circuit disposed in the main-body case for detecting a leakage current, a power-supply line connected to the main circuit for supplying voltage of the main circuit to the leakage-detection circuit, and a test switch disposed in the main-body case for turning on and off a power supply circuit of the power-supply line when the switch mechanism turns on and off the main contact, said test switch being associated with the switch mechanism and operable to turn on and off the power supply circuit of the power supply line when the operating handle is actuated to turn on and off the switch mechanism.

2. An earth leakage breaker according to claim 1, wherein said test switch is an auxiliary switch attached to the earth leakage breaker.

3. An earth leakage breaker according to claim 1, wherein said test switch is arranged so that the switch mechanism turns off the main contact when the test switch turns off the power-supply line.

4. An earth leakage breaker according to claim 3, wherein said test switch is provided with an actuator moved according to an on-off operation thereof and connected to a tripping cross bar of the switch mechanism so that when the test switch is turned off, the tripping cross bar is driven to a latch release position to thereby trip the switch mechanism and the tripping cross bar is held at the latch release position to prevent the main contact from turning on, and the tripping cross bar is released from the latch release position when the test switch turns on the power-supply line.

5. An earth leakage breaker according to claim 3, wherein said test switch is provided with an actuator moved according to an on-off operation thereof and connected to a tripping cross bar of the switch mechanism so that when the test switch is turned off, the tripping cross bar is driven to a latch release position to thereby trip the switch mechanism and said tripping cross bar is driven to a latch release position to reset the latch by a reset operation of the handle, and the test switch is returned on through the tripping cross bar.

6. An earth leakage breaker for protecting a main circuit against over-current and ground failure, comprising:

a main-body case.

a main contact disposed in the main-body case.

a switch mechanism disposed in the main-body case and connected to the main contact for turning on and off the same.

an operating handle attached to the switch mechanism for operating the switch mechanism.

a leakage tripping device disposed in the main-body case for performing a tripping operation.

an over-current tripping device disposed in the main-body case for performing a tripping operation.

a leakage-detection circuit disposed in the main-body case for detecting a leakage current a power-supply line connected to the main circuit for supplying voltage of the main circuit to the leakage-detection circuit, and a test switch disposed in the main-body case for turning on and off a power supply circuit of the power-supply line when the switch mechanism turns on and off the main contact;

wherein said test switch is arranged so that the switch mechanism turns off the main contact when the test switch turns off the power-supply line;

wherein said test switch is provided with an actuator moved according to an on-off operation thereof and connected to a tripping cross bar of the switch mechanism so that when the test switch is turned off, the tripping cross bar is driven to a latch release position to thereby trip the switch mechanism and the tripping cross bar is held at the latch release position to prevent the main contact from turning on, and the tripping cross bar is released from the latch release position when the test switch turns on the power-supply line; and wherein said test switch is a sliding switch or toggle switch having an operating knob, said actuator being disposed on an operating member connected to the operating knob.

7. An earth leakage breaker according to claim 5, wherein said test switch is a sliding switch or toggle switch having an operating knob, said actuator being disposed on an operating member connected to the operating knob.

8. An earth leakage breaker according to claim 1, further comprising a zero-phase current transformer disposed in the main-case body for detecting an unbalance current in the main circuit, said test switch being disposed in a space between the zero-phase current transformer and a sidewall of the main body case, said test switch being turned off in testing dielectric strength to separate the leakage-detection circuit from the main circuit.

9. An earth leakage breaker for protecting a main circuit against over-current and ground failure, comprising:

a main-body case, a main contact disposed in the main-body case.

a switch mechanism disposed in the main-body case and connected to the main contact for turning on and off the same.

an operating handle attached to the switch mechanism for operating the switch mechanism, a leakage tripping device disposed in the main-body case for performing a tripping operation, an over-current tripping device disposed in the main-body case for performing a tripping operation, a leakage-detection circuit disposed in the main-body case for detecting a leakage current, a power-supply line connected to the main circuit for supplying voltage of the main circuit to the leakage-detection circuit, a test switch disposed in the main-body case for turning on and off a power supply circuit of the power-supply line when the switch mechanism turns on and off the main contact; and a zero-phase current transformer disposed in the main-case body for detecting an unbalance current in the main circuit, said test switch being disposed in a space between the zero-phase current transformer and a side-wall of the main body case, said test switch being turned off in testing dielectric strength to separate the leakage-detection circuit from the main circuit;

wherein said test switch includes an operating section facing a window hole formed in an upper cover of the main-body case and is interconnected to a trip cross bar of the switching mechanism for driving the trip cross bar to a latch releasing position and holding the same to open the main circuit when the test switch turns off the power-supply line.

10. An earth leakage breaker according to claim 9, wherein said test switch is provided with, as an interlocking device, an actuator at the operating section thereof moved according to a movement thereof, said actuator interconnecting the test switch and the trip cross bar via an armature of the over-current tripping device.

11. An earth leakage breaker according to claim 9, wherein said test switch is provided with, as an interlocking device, an actuator at the operating section thereof moved according to a movement thereof, said actuator being interconnected with the trip cross bar via a slider of a trip coil unit of the over-current tripping device.

12. An earth leakage breaker according to claim 9, wherein said test switch is provided with an actuator connected to the manual operating section thereof and extending toward the trip cross bar.

13. An earth leakage breaker according to claim 1, further comprising a switch for testing dielectric strength, which disconnects the power-supply line, and said switch for testing dielectric strength is a manually operable switch for testing dielectric strength, which is connected to respective lines of power source lines or the respective lines excluding one line, and collectively turns the power source lines ON and OFF.

14. An earth leakage breaker according to claim 1, further comprising a manually operable switch for testing dielectric strength, which turns the power supply circuit of the power source line ON and OFF, and the switch for testing dielectric strength prevents the power from supplying to the main circuit when the switch for testing dielectric strength is held at the OFF position.

15. An earth leakage breaker according to claim 1, wherein the test switch is disposed between the main circuit and the leakage-detection circuit.

16. An earth leakage breaker according to claim 1, wherein the test switch is operable to prevent the operating handle from actuating the switch mechanism to turn the main contact on if the test switch has not been turned on after being turned off.

* * * * *

UNITED STATES PATENT AND TRADEMARK OFFICE

CERTIFICATE OF CORRECTION

PATENT NO. : 7,167,349 B2
APPLICATION NO. : 10/790197
DATED : January 23, 2007
INVENTOR(S) : Hisanobu Asano et al.

It is certified that error appears in the above-identified patent and that said Letters Patent is hereby corrected as shown below:

Please change column 9, line 12, “handle 4,” to -- handle 4 --, column 11, line 51, “powersource” to -- power source --, column 11, line 52, “leakagebreaker” to -- leakage breaker -- , column 11, line 52, “includesa” to -- includes a --, column 17, line 2, “case.” to -- case, --, and column 17, line 5, “same.” to -- same, --.

Signed and Sealed this

Third Day of April, 2007

JON W. DUDAS
*Director of the United States Patent and Trademark Office*